US011120498B2

(12) United States Patent
Chen et al.

(10) Patent No.: US 11,120,498 B2
(45) Date of Patent: Sep. 14, 2021

(54) COMPUTER-IMPLEMENTED SYSTEMS AND METHODS FOR REAL-TIME RISK-INFORMED RETURN ITEM COLLECTION USING AN AUTOMATED KIOSK

(71) Applicant: COUPANG CORP., Seoul (KR)

(72) Inventors: Yonghui Chen, San Diego, CA (US); Xin Jin, Sunnyvale, CA (US); Yan Zhou, San Jose, CA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/845,239

(22) Filed: Apr. 10, 2020

(65) Prior Publication Data

US 2021/0049684 A1   Feb. 18, 2021

Related U.S. Application Data

(63) Continuation of application No. 16/542,588, filed on Aug. 16, 2019, now Pat. No. 10,657,591.

(51) Int. Cl.
*G06Q 40/06* (2012.01)
*G06Q 40/02* (2012.01)
(Continued)

(52) U.S. Cl.
CPC ......... *G06Q 40/025* (2013.01); *G06Q 20/208* (2013.01); *G06Q 40/00* (2013.01)

(58) Field of Classification Search
CPC .... G06Q 40/025; G06Q 20/208; G06Q 40/00; G06Q 40/06
See application file for complete search history.

(56) References Cited

U.S. PATENT DOCUMENTS 7,537,521 B2 * 5/2009 Amour .................. G06Q 20/20
463/17
8,275,708 B1   9/2012 Dennes et al.
(Continued)

FOREIGN PATENT DOCUMENTS

CN          102005090 A       4/2011
CN          103530911 B       8/2015
(Continued)

OTHER PUBLICATIONS

Pam Dixon and Robert Gellman, The Scoring of America: How Secret Consumer Scores Threaten Your Privacy and Your Future, Apr. 2, 2014, World Privacy Forum, web, 6-88 (Year: 2014).*

(Continued)

*Primary Examiner* — I Jung Liu
(74) *Attorney, Agent, or Firm* — Finnegan, Henderson, Farabow, Garrett & Dunner, LLP

(57) ABSTRACT

Disclosed embodiments provide systems and methods related to collecting return items using an automated kiosk based on a real time risk decision. The automated kiosk captures return item information representing a return item and transmits the return item information and a request for return risk level relating to the return item to a server operable to execute a machine learning model trained on historical information to determine the risk level. The server determines the risk level based on the received return by using the machine learning model and transmits the determined risk level to the kiosk in real-time. Based on the determined risk level and a return amount associated with the return item, the server may also process a refund in real-time.

12 Claims, 10 Drawing Sheets

(51) Int. Cl.
*G06Q 40/00* (2012.01)
*G06Q 20/20* (2012.01)

(56) References Cited

U.S. PATENT DOCUMENTS

| | | | |
|---|---|---|---|
| 10,657,591 B1 | 5/2020 | Chen et al. | |
| 2009/0018891 A1* | 1/2009 | Eder | G06Q 10/06375 705/7.28 |
| 2011/0087606 A1 | 4/2011 | Hammond et al. | |
| 2012/0191562 A1 | 7/2012 | Bowles et al. | |
| 2013/0282443 A1 | 10/2013 | Bal et al. | |
| 2014/0172697 A1 | 6/2014 | Ward et al. | |
| 2015/0109451 A1 | 4/2015 | Dhankar | |
| 2016/0042351 A1 | 2/2016 | Syed et al. | |
| 2018/0130071 A1 | 5/2018 | Yao et al. | |
| 2019/0172041 A1 | 6/2019 | Hill | |

FOREIGN PATENT DOCUMENTS

| | | |
|---|---|---|
| CN | 105550832 A | 5/2016 |
| CN | 107004196 A | 8/2017 |
| CN | 108717749 A | 10/2018 |
| CN | 109191192 A | 1/2019 |
| CN | 110009154 A | 7/2019 |
| CN | 110047007 A | 7/2019 |
| KR | 10-2010-0006802 | 1/2010 |
| KR | 10-2017-0064872 A | 6/2017 |
| KR | 10-2018-0129850 | 12/2018 |
| KR | 10-2019-0083608 | 7/2019 |

OTHER PUBLICATIONS

International Search Report and Written Opinion in International Application No. PCT/IB2020/056621, dated Oct. 21, 2020.
Pam Dixon and Robert Gellman, The Scoring of America: How Secret Consumer Scores Threaten Your Privacy and Your Future, Apr. 2, 2014, World Privacy Forum, web, 6-88 (Year: 2014), 90 pages.
Australian Examination Report in counterpart AU Application No. 2020260504 dated Dec. 9, 2020 (6 pages).
Taiwanese IPO Search Report and Office Action in counterpart TW Application No. 109124542 dated Jan. 26, 2021 (10 pages).
Korean Intellectual Property Office Notice of Preliminary Rejection in counterpart Korean Patent Application No. 10-2019-0109391 dated Apr. 13, 2021, and translation (11 pages).
Hong Kong Examination Report in counterpart HK Application No. 22020012163.4 dated Jun. 3, 2021 (5 pages).
Australian Examination Report in counterpart AU Application No. 2020260504 dated Jun. 22, 2001 (3 pages).

* cited by examiner

COMPUTER-IMPLEMENTED SYSTEMS AND METHODS FOR REAL-TIME RISK-INFORMED RETURN ITEM COLLECTION USING AN AUTOMATED KIOSK

CROSS-REFERENCE TO RELATED APPLICATIONS

This application is a continuation of U.S. application Ser. No. 16/542,588, filed Aug. 16, 2019. The content of the above-referenced disclosure is expressly incorporated by reference in its entirety.

TECHNICAL FIELD

The present disclosure generally relates to computerized systems and methods for collecting return items using an automated kiosk. In particular, embodiments of the present disclosure relate to inventive and unconventional systems relate to computer implemented systems, methods, and apparatus for efficiently collecting return items based on a real time risk decision.

BACKGROUND

Return fraud is a common problem in the retail industry. Typical return loss is from empty boxes, damaged items, wrong items, return fraud ring, etc. In addition to typical return loss, there is additional labor cost due to inspection and re-stocking. Returns also cause markdowns, out of stocks, and other expenses. Although currently existing systems for collecting return items are configured to detect return frauds, a common issue arises when the systems cannot accept or reject a return item immediately and process a refund. For example, a customer associated with a high amount return item may want to receive a refund immediately upon returning the item, but the systems cannot process an immediate refund because it cannot immediately decide whether the return is fraudulent. This leads to poor customer satisfaction, and a review from the dissatisfied customer may discourage potential sales from other buyers.

To mitigate such problems, conventional electronic systems use return policies (e.g., electronically-enforced rules) to handle return fraud. The policies allow customers to gain a sense of security, which in turn shows a merchant to be one of quality and commitment. However, such policies are usually too strict and inflexible that frequent updates are needed. While these systems attempt to process returns in an efficient manner, many times customers could not receive an immediate and needed refund, and merchants could not reduce fraudulent return loss by taking real-time action accordingly. For example, high risk returns can be rejected immediately to reduce direct money lost or deliver/restocking cost, and low risk returns can receive immediate refund to gain better customer experience.

Therefore, there is a need for improved methods and systems for efficient return fraud detection to reduce return loss.

SUMMARY

One aspect of the present disclosure is directed to an automated kiosk for collecting return items based on a real time risk decision. The automated kiosk may comprise an imaging device, a receptacle, a network interface, a display screen, and one or more containers, each container associated with an identifier associated with a status of empty or occupied. The automated kiosk may further comprise one or more memory device storing instructions and one or more processors configured to execute the instruction to perform operations. The operations may comprise responding to a user input by capturing, with the imaging device, return item information representing a return item and transmitting the return item information and a request for return risk level relating to the return item, via the network interface, to a server operable to execute a machine learning model trained on historical information to predict the risk score. The server is configured to prepare the return risk level in response to the request by predicting a risk score of the return request based on the received return by using the machine learning model, determining a risk level based on the predicted risk score, and transmitting the determined risk level to the kiosk. When the server transmits the risk level, the operations may further comprise receiving the transmitted risk level through the network interface from the server, determining a return result based on the received risk level, and displaying the return result on the display screen. The operations are performed in real-time.

Another aspect of the present disclosure is directed to a method for collecting return items using an automated kiosk based on a real time risk decision. The method may comprise responding to a user input by capturing, with an imaging device, return item information representing a return item and transmitting the return item information and a request for return risk level relating to the return item, via a network interface, to a server operable to execute a machine learning model trained on historical information to predict the risk score. The server is configured to prepare the return risk level in response to the request by predicting a risk score of the return request based on the received return by using the machine learning model, determining a risk level based on the predicted risk score, and transmitting the determined risk level to the kiosk. When the server transmits the risk level, the method may further comprise receiving the transmitted risk level through the network interface from the server, determining a return result based on the received risk level, and displaying the return result on a display screen. The method is performed in real-time.

Yet another aspect of the present disclosure is directed to a system comprising the automated kiosk as discussed above, and a server. Consistent with disclosed embodiments, the server is operable to execute a machine learning model trained on historical information to predict a risk score. The server may include one or more memory devices storing instructions and one or more processors configured to execute the instructions to perform operations. The operations comprise receiving return item information and a request for return risk level relating to a return item from the kiosk, predicting a risk score of the return request based on the received return by deploying the machine learning model, determining a risk level based on the predicted risk score, and transmitting the determined risk level to the kiosk.

Other systems, methods, and computer-readable media are also discussed herein.

DETAILED DESCRIPTION

Figure 1A:
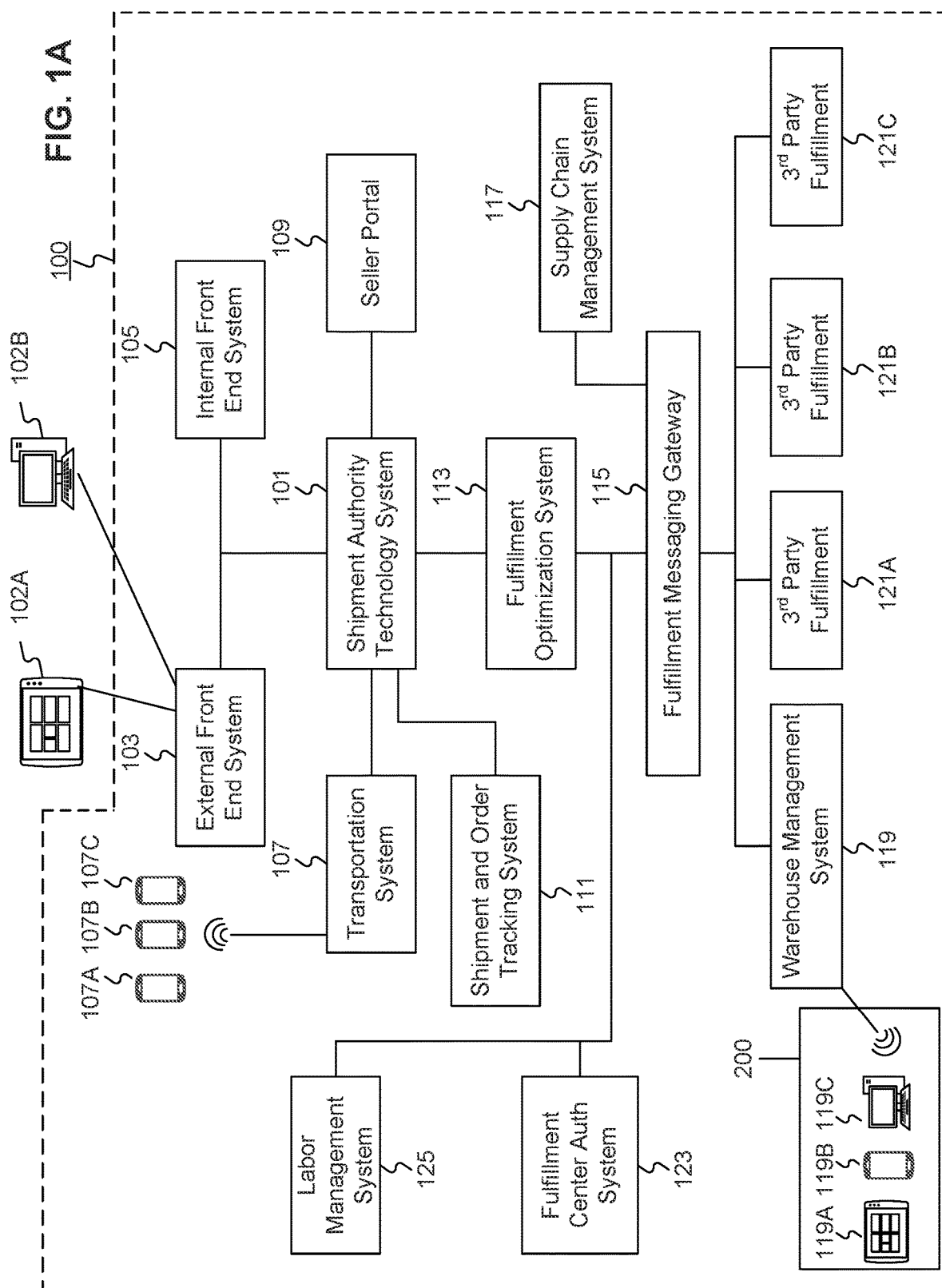
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for collecting return items based on a real time risk decision by using an automated kiosk. The disclosed embodiments provide innovative technical features that allow for collecting return items based on a real time risk decision. For example, the disclosed embodiments enable transmission of return item information representing a return item from an automated kiosk to a server operable to execute a machine learning model trained on historical information to predict a risk score, and enable the server to determine a risk level associated with the return item based on the predicted risk score and transmit the determined risk level to the kiosk to conveniently accept or reject the return item based on the determined risk level. Moreover, the disclosed embodiments provide innovative technical features that allow for processing a refund for a return based on a determined risk level associated with the return. For example, the disclosed embodiments enable determination of a refund based on a determined risk level associated with a return and a return amount, and enable efficient process of the determined refund.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
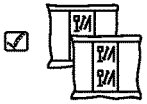
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3rd party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
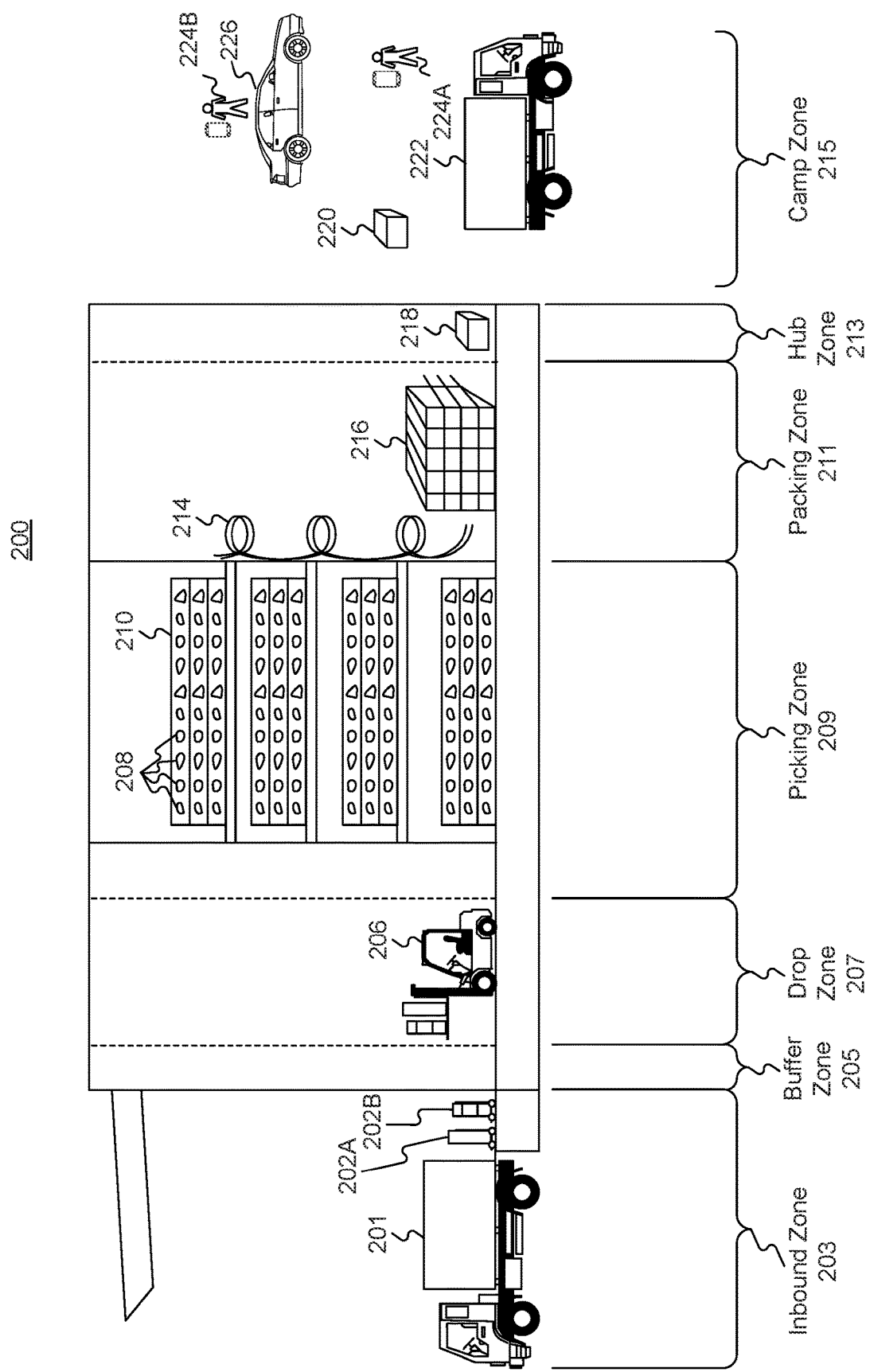
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 2246.

Figure 3:
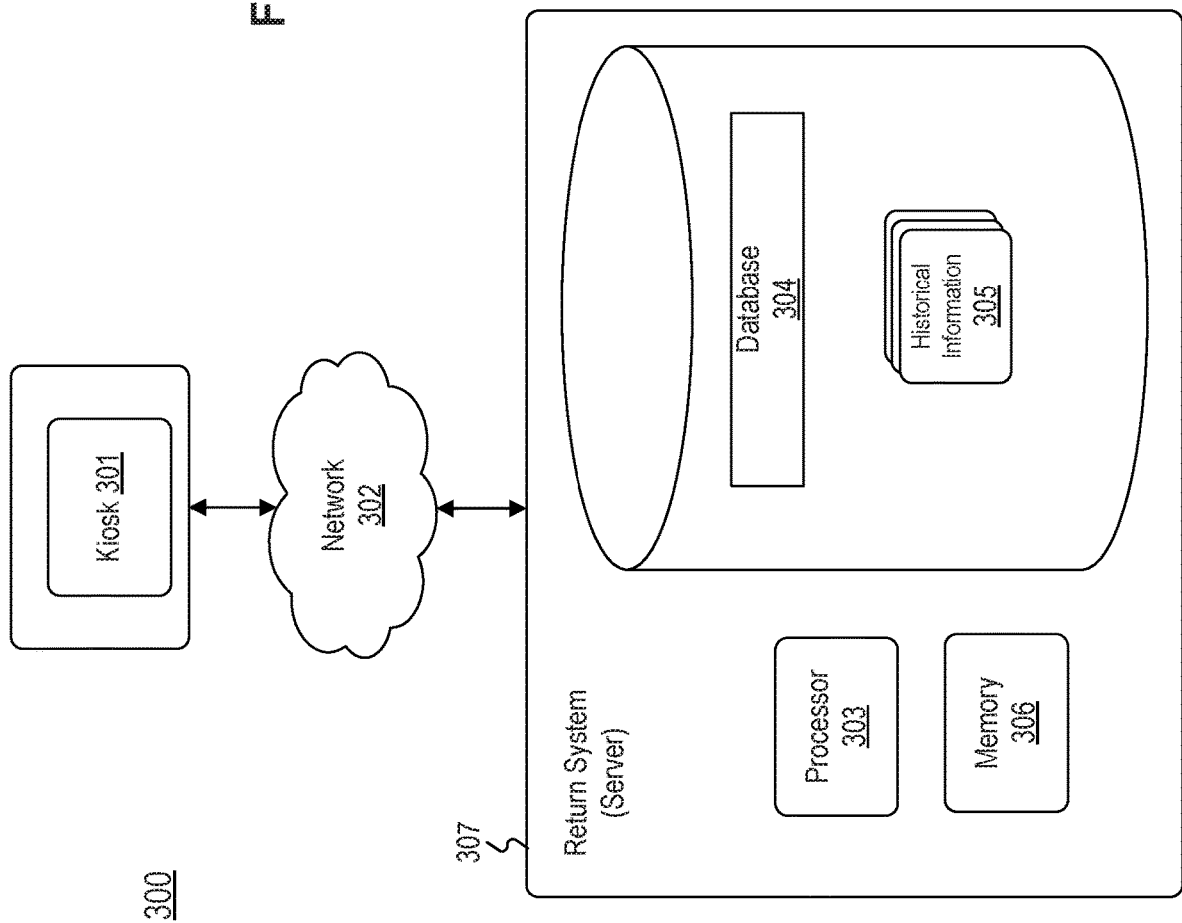
FIG. 3 is a schematic diagram of an exemplary system environment that may be configured to provide real-time decision on return items, consistent with the disclosed embodiments.

FIG. 3 is a schematic diagram of an exemplary system environment that may be configured to provide real-time decision on return items. The components and arrangement shown in FIG. 3 are not intended to limit the disclosed examples as the components used to implement the disclosed processes and features may vary.

In accordance with the disclosed embodiments, a real-time return decision system 300 may include an automated kiosk 301, a network 302, and a return system 307.

Kiosk 301 may comprise a locker, a cabinet, a closet, a trunk or any suitable apparatus with computing, storing, and communicating capability which enable kiosk 301 to communicate with return system 307 through a network 302. Each component of Kiosk 301 is discussed in additional detail with respect to FIG. 4 below.

Kiosk 301 may be relatively portable and have capacity to store return items. For example, a large-size kiosk 301 dimension may be about 5'×5'×10', with 30 containers, wherein each container is 2'×2'×1'. The large-size kiosk 301 may take about 30 return items before the items are physically collected. Similarly, a small-size kiosk 301 may take about 10 return items. Each container has its corresponding identifier in return system 307.

Kiosk 301 may be located at, but not limited to, a shopping center, a regular retail store, a post office, etc. Kiosk 301 may be visible and safe for a customer to access. The kiosk 301 may be distributed according to the population density, accessibility, or compacity.

Kiosk 301 may first start a return process comprising a real-time return decision on a return item by authenticating a customer. For example, kiosk 301 may capture a QR code associated with a customer presented by a customer for scanning and transmit an authentication request along with the captured QR code to return system 307. Upon receiving the request, return system 307 may authenticate the customer associated with the transmitted QR code. In another example, kiosk 301 may authenticate a customer by capturing user inputs on the kiosk 301. The customer may input a username and a corresponding password. When the kiosk 301 receives the inputs, kiosk 301 may transmit the inputs to return system 307 for authenticating the customer. If kiosk 301 could not fully verify the customer, kiosk 301 may perform additional verification such as direct phone call or photo verification. For example, kiosk 301 may call a phone number associated with a customer and verify the customer upon the customer's receipt of the call. In another example, kiosk 301 may take a photo of the customer using imaging device 401 and compare it with available photos of the customer stored in return system 307.

After authenticating the customer, kiosk 301 may transmit a request for a return risk level to return system 307. Kiosk 301 may capture return item information representing a return item, which is transmitted to return system 307 for computing a risk score relating to the return item, to request a return risk level. For example, kiosk 301 may capture return item information including, but not limited to, an order ID, an item ID, product barcode, a pre-generated QR code, or a pre-generated return ID, and transmit the captured return item information to return system 307 along with a request for a return risk level. The pre-generated QR code and the pre-generated return ID may be generated by a computer-implemented device associated with a customer. The device may transmit a request for a QR code or return ID for a return item to external front end system 103 and the external front end system 103 may provide the requested QR code or return ID to the device. External front end system 103, upon generating the QR code or the return ID, may transmit the generated QR code or the return ID to return system 307 to store. For example, when a kiosk 301 transmits a pre-generated return ID to return system 307, the return system 307 may look up the received return ID in stored return IDs. If the received return ID matches one of the stored return IDs, return system 307 may send an indication to the kiosk 301 that a return item associated with the received return ID is validated. The return ID may also be generated at kiosk 301.

Most items are eligible to utilize a kiosk 301 for return. However, some items may not be returned via kiosk 301. Un-returnable items may include, for example, oversized items, fragile items, expensive items, or items with a high-risk return level. A process of deciding the item with a high-risk return is described below with respect to return system 307.

In various embodiments, an automated kiosk 301 may be operably coupled to return system 307 by a network 302. Network 302 may be any type of network such as a local area network (LAN), a wide area network (WAN), or other type of network.

Return system 307, in some embodiments, may be implemented as a computer system (e.g., a server) that determines a risk level relating to a return item by executing a machine learning model trained on historical information 305 stored in database 304 in real time. Return system 307 may comprise a communicating capability which enables return system 307 to communicate with system 100 in FIG. 1A through internal front end system 105. In addition, return system 307 may also process a refund for the return item. In some embodiments, return system 307 may include one or more memory devices 306 storing instructions and one or more processors 303, which may predict a risk score of a return request relating to a return item, transmitted from kiosk 301, by deploying the machine learning model on the return item. The return request may comprise information related to return such as a customer ID, an order ID, a return ID, product information, etc. Upon receiving the return request, processor 303 may predict a risk score associated with the return item in real-time, so a customer returning the return item may receive a decision at the kiosk 301 immediately. The prediction may involve an efficient method to calculate historical variable that are common in a supervised machine learning model, e.g., a Gradient Boosting Tree Model. The supervised learning is where the model uses an algorithm to learn the mapping function from input variables (x) to an output variable (Y). For example, the supervised machine learning model is trained on historical information (x) with selected variables to predict the risk score (Y). A few examples of input variable may be a return history, a return amount, a list of returned products, a return time, etc. The output of model, a risk score (Y) relating to a return item, may determine a risk score of return, wherein the risk score is higher for a high risk return item.

The risk score may be combined with specific rules to satisfy business or compliance requirements. With a powerful and reliable risk model score and selected thresholds, kiosk 301 may divide return items into high-risk, low-risk, or medium-risk and handle the different risk level return items separately for processing refunds.

In some embodiments, return system 307 may assign most returns to low risk returns. For example, return system 307 may set a score threshold so that about 75% returns are labeled as low risk. Setting a score threshold for low risk returns may facilitate immediate return process for good customers. Return system 307 may include historical tags associated with return frauds and the historical tags may train the supervised machine learning model and estimate the score threshold. The score threshold may be predefined to provide real time decisions to the kiosk 301. For example, return system 307 may assign low risk to a return when the predicted score of the return is below a predefined score threshold 40. However, return system 307 may adjust the fraud loss to be less than 20% of total return fraud loss, which is usually tolerable given the positive impacts to most good customers.

In some embodiments, return system 307 may assign some returns to high-risk returns. For example, return system 307 may set a score threshold so that about 10% returns are labeled as high risk. Return system 307 may catch 50% return frauds with acceptable false positives among high risk returns.

In some embodiments, return system 307 may assign some returns to medium risk returns. For example, return system 307 may set a score threshold so that about 15% orders are labeled as medium risk. The medium risk returns are accepted at kiosk 301 but return system 307 may postpone a refund until it is verified by manual review team. Return system 307 may catch 30% fraud before a direct lost.

Return system 307 may transmit a risk level to the kiosk 301 when the risk level is determined by assignments based on specific rules satisfying business or compliance requirements. In some embodiments, kiosk 301 may receive the risk level from return system 307 through the network 302. Based on the received risk level, kiosk may proceed with different instructions. For example, if a risk level is high, kiosk 301 may show a decision to a customer rejecting the return accompanied with a rejection reason. In another example, if a risk level is low, kiosk 301 may show a notification that the return was accepted, an instruction to insert the item for return, and eject a container for a customer to store the return item. By way of further example, if a risk level is medium, kiosk 301 may request additional information to a customer. The additional information may be, but not limited to, an image of return item, a picture of the customer, or additional proof related to the return. Kiosk 301 may determine to accept or reject the return item after the additional information is validated. When the container is ejected to store the return item, a customer may place the return item inside the container and return the container to the kiosk 301.

When the kiosk 301 receives the container storing the return item, it may transmit a return confirmation to return system 307. The return confirmation may include return item information representing the return item, a risk level associated with the return item, and an identifier associated with the container storing the return item. Upon receiving the return confirmation from the kiosk 301, return system 307 may store the received return confirmation. The stored return confirmation, as historical information, may train the supervised machine learning model.

Return system 307 may also determine a refund based on a received risk level associated with a return item and a return amount associated with return item information. For example, return system 307 may process an instant refund for a low risk & low amount return item, a fast refund, needing an item verification, for a low risk & high amount return item, and a postponed refund for a medium risk return item. The high & low amount is determined by comparing the return amount against a predefined amount and the postponed refund may require an item verification or card information verification. In another example, return system 307 may reject returns for a high risk return item. The rejection may accompany a reject reason and an account block.

After a refund type determination, return system 307 may process the determined refund. The process may require storing related information about a return amount, an order amount, or pending amount. For example, return system 307 may process instant refund by issuing a refund amount to a bank account associated with a return customer.

Return system 307 may transmit the determined risk level in various methods. For example, return system 307 may transmit a text message or phone call notification to a mobile device associated with a customer. In another example, return system 307 may transmit an email message to an email address associated with a customer with a title about the return item. By way of further example, return system 307 may transmit a notification to a mobile application running on a mobile device associated with a customer. The notification may display "Your return is successful and your return is processed," for a low risk & low amount return item.

Return system 307 may also transmit a determined refund type to the kiosk 301 via network 302. Upon receiving the refund type, kiosk 301 may display the received refund type. For example, kiosk 301 may display "Your Return is successful and your refund is in process until the item is verified," for a fast refund associated with a low risk & high amount return item.

External front end system 103, upon receiving a request for a location of kiosk 301 from a customer, may request return system 307 for the location of kiosk 301. Return system 307 may recommend the requested location by finding a closest kiosk from a customer's home address or a customer's defined address, or finding a kiosk with more available spaces. Return system 307 may also recommend a closest kiosk with available spaces.

Kiosk 301 needs to be well-maintained to perform functions described above. Security is also needed to assure that kiosk 301 is not abused or broken. For example, kiosk 301 may send a request to return system 307 to remove stored return items when the kiosk 301 is more than 80% occupied. Return system 307 may request a mobile device associated with a worker to retrieve the return items from the kiosk 301. In another example, kiosk 301 may transmit a request to return system 307 for a repair when it experiences machinal or electronic failures. Kiosk 301 may also utilize an affixed imaging device to detect a fraud or abuse behavior.

Figure 4:
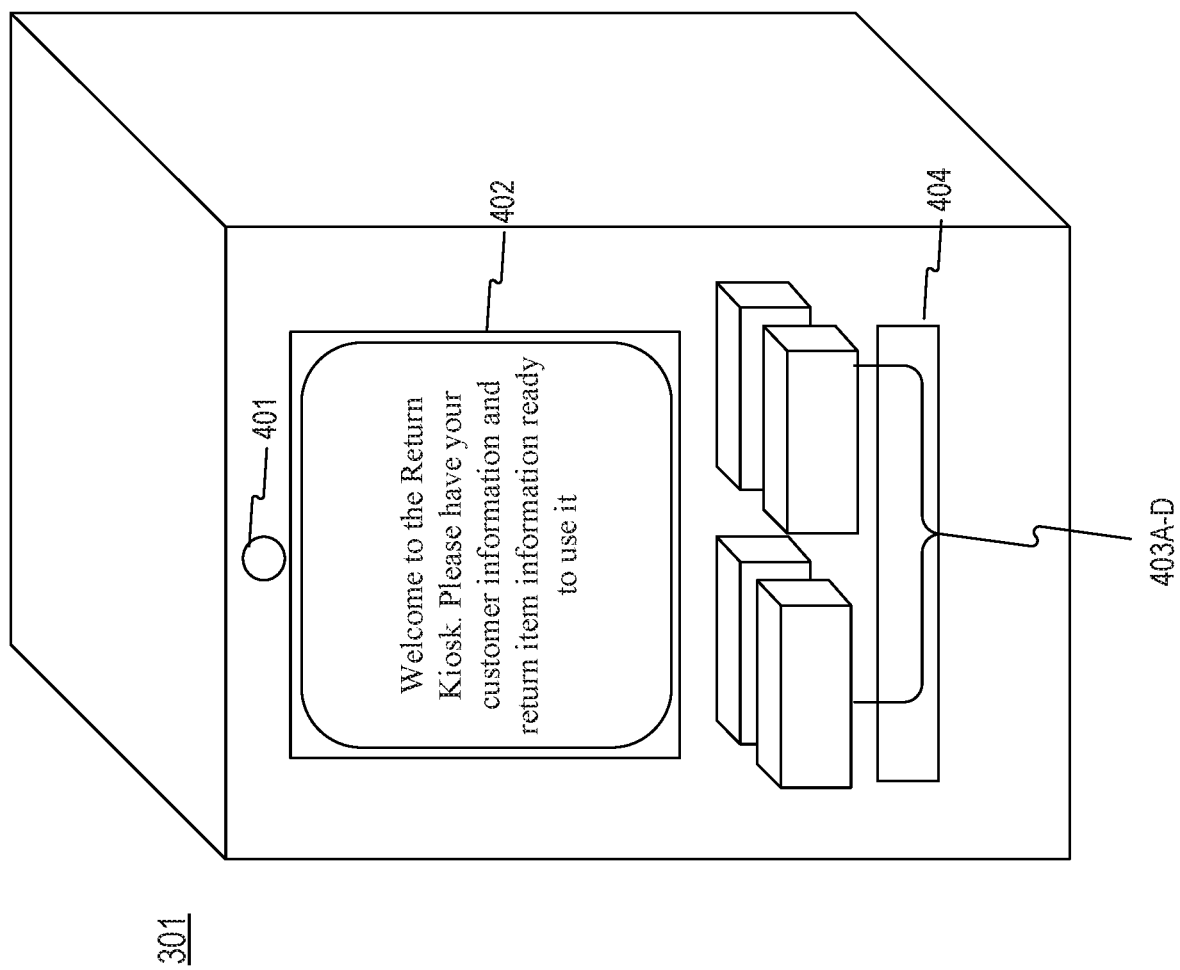
FIG. 4 depicts an exemplary diagram of kiosk, configured to perform functions of the disclosed methods, consistent with the disclosed embodiments.

FIG. 4 depicts an exemplary diagram of kiosk 301, configured to perform functions of the disclosed methods. Kiosk 301 may comprise a locker, a cabinet, a closet, a trunk or any suitable apparatus with computing, storing, and communicating capability which enable kiosk 301 to communicate with return system 307. Kiosk 301 may include an imaging device 401, a display 402, one or more containers 403A-D, and a receptacle 404.

Imaging device 401 may capture return item information representing a return item and additional information related to a middle risk return item that are transmitted to return system 307 for determining a return risk associated with the return item. Imaging device 401 may comprise a camera, a scanner, or any suitable device with capturing capability. For example, imaging device 401 may capture a product barcode associated with a return item and transmit return item information associated with the captured barcode to return system 307 via network 302. Imaging device 401 may also authenticate a customer and validate a return item. For example, imaging device 401 may capture a QR code associated with a customer to authenticate the customer or capture an item ID associated with a return item to validate the return item. Imaging device 401 may also detect a fraud or abuse behavior.

Display 402 may capture return information representing a return item and a return reason that are transmitted to return system 307 for determining a return risk associated with the return item. For example, a customer may enter an order ID associated with a return item and select a pre-defined return reason on a display 402 of a kiosk 301. By way of further example, a customer may enter an order ID and select a return reason by using a pressure-sensitive input mechanism (e.g., a touch-screen device or keyboard) or any other appropriate selection mechanism on a display 402 in a kiosk 301. Display 402 may also generate a return ID associated with a return item.

Display 402 may provide information related to a return decision and following instructions, and a refund process. For example, display 402 may show a rejection decision with a reason for a high risk return item. By way of further example, display 402 may show an acceptance notification and instructions for returning the item by storing an item for return in an ejected container 403A and returning the container 403A via receptacle 404. For the refund process, display 402 may present "You are not allowed to use kiosk for auto return and your account is blocked. Please call customer service to unblock it," for some high risk return items.

Containers 403A-D may store an accepted return item and an identifier associated with each container 403A-D is transmitted to return system 307 to be stored with return item information relating to the accepted return item. For example, when a container 403A, storing an accepted return item, is returned to kiosk 301 via receptacle 404, kiosk 301 may transmit an identifier associated with the container 403A and return item information relating to the return item to return system 307. Return system 307, upon receiving the identifier and the return item information, may store the received identifier and the return item information.

Figure 5:
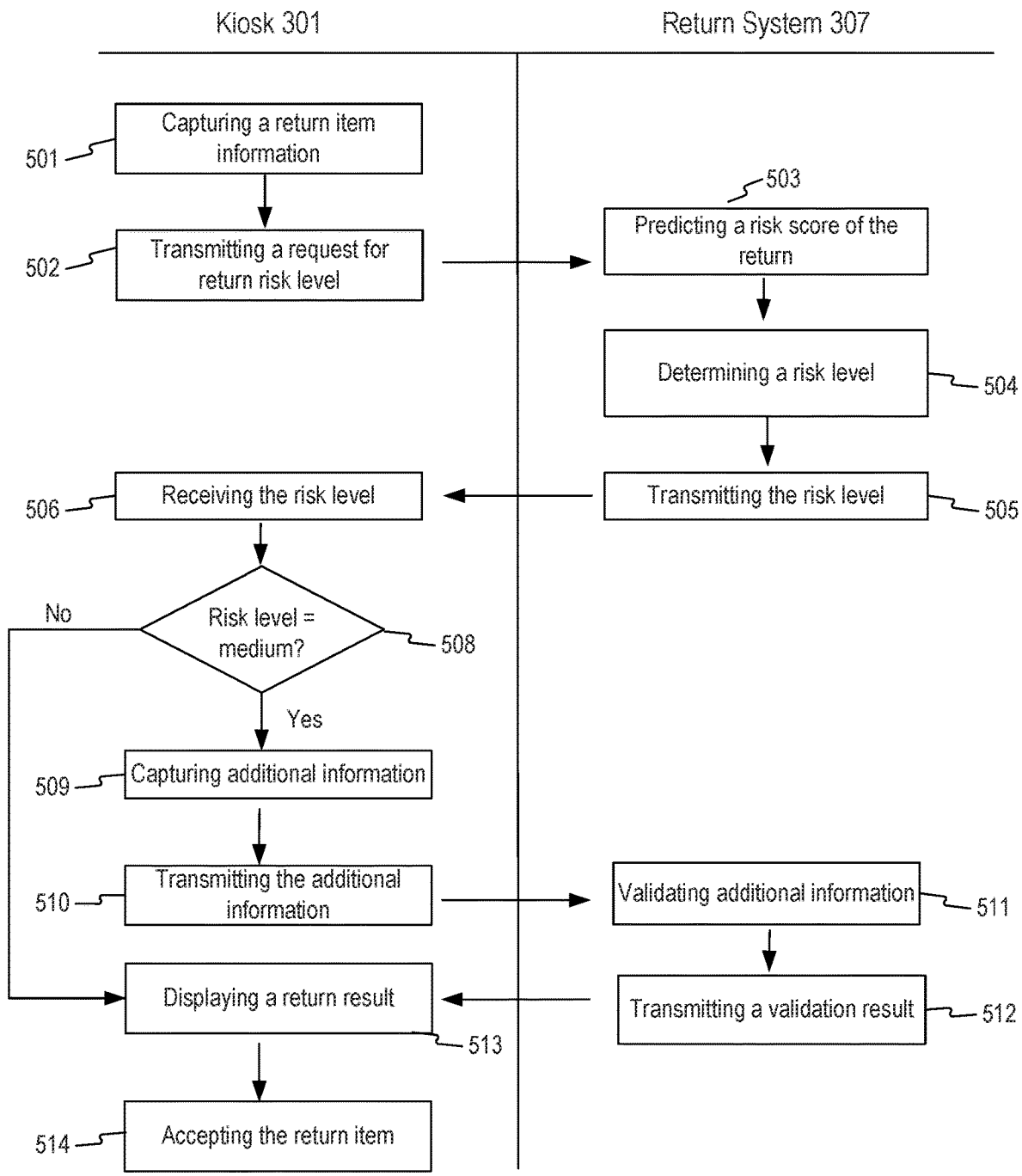
FIG. 5 is an exemplary flow chart of process for determining a return risk related to a return item using an automated kiosk in real time, consistent with the disclosed embodiments.

FIG. 5 is an exemplary flow chart of process 500 for determining a return risk related to a return item using an automated kiosk 301 in real time. While FIG. 5 is described with respect to a kiosk 301 and return system 307, one of ordinary skill in the art will recognize that other configurations are possible.

In step 501, kiosk 301 may capture return item information representing a return item, which is transmitted to return system 307 for a risk score relating to the return item by using an imaging device 401 or a display 402. For example, an imaging device 401 of kiosk 301 may capture an order ID, an item ID, product barcode, a pre-generated QR code, or a pre-generated return ID. The pre-generated QR code and the pre-generated return ID may be generated by a computer-implemented device associated with a customer. The device may transmit a request for a QR code or return ID for a return item to external front end system 103 and the external front end system 103 may provide the requested QR code or return ID to the device. External front end system 103, upon generating the QR code or the return ID, may transmit the generated QR code or the return ID to return system 307 to store. For example, when kiosk 301 transmits a pre-generated return ID to return system 307, the system may look up the received return ID in stored return IDs. If the received return ID matches one of the stored return IDs, return system 307 may send an indication to the kiosk 301 that a return item associated with the received return ID is validated. The return ID may also be generated at kiosk 301.

In step 502, kiosk 301 may transmit a request for a return risk level to return system 307. Kiosk 301 may also determine whether the item is un-returnable (e.g., because it is oversized, fragile, or expensive) and may reject it. The kiosk 301 may transmit the captured return item information from step 501 and a request for a return risk level related to the return item to return system 307. For example, kiosk 301 may transmit the captured return item information to return system 307 along with a request for a return risk level. If the received return risk level sent from the return system 307 is high or medium without additional information verification, kiosk 301 may reject the return item.

In step 503, return system 307 may predict a risk score of the received return request sent from step 502 by deploying a machine learning model on the return item. The return request may comprise information related to return such as a customer ID, order ID, return ID, product information, etc. Upon receiving the return request, return system 307 may predict a risk score associated with the return item in real-time, so a customer returning the return item may receive a decision at a kiosk 301 immediately. The prediction may involve an efficient method to calculate historical variables that are common in a supervised machine learning model, e.g., a Gradient Boosting Tree Model. The supervised learning is where the model uses an algorithm to learn the mapping function from input variables (x) to an output variable (Y). For example, the supervised machine learning model is trained on historical information (x) with selected variables to predict the risk score (Y). A few examples of input variable may be a return history, a return amount, a list of return products, a return time, etc. The output of model, a risk score (Y) relating to a return item, may determine a risk score of return, wherein the risk score is higher for a high-risk return item.

In step 504, return system 307 may determine a risk level of the return item by combining the predicted risk score and specific rules to satisfy business or compliance requirements. With a powerful and reliable risk model score and selected thresholds, return system 307 may divide return items into high-risk, low-risk, or medium-risk and handle the different risk level return items separately for processing refunds. For example, return system 307 may assign most returns to low risk returns, some returns to high risk returns, and some returns to medium risk returns by setting a score threshold so that about 75% of returns are labeled as low risk, 10% of returns are labeled as high risk, and 15% of returns are labeled as medium risk. Setting a score threshold for low risk returns may facilitate immediate return process for good customers. However, return system 307 may adjust the fraud loss to be less than 20% of total return fraud loss, which is usually tolerable given the positive impacts to most good customers. Return system 307 may also catch 50% of fraudulent returns with acceptable false positives among high risk returns. The medium risk returns are accepted at kiosk 301 but return system 307 may postpone a refund until the return item is verified by manual review team. Return system 307 may catch 30% fraud before a direct loss including empty boxes, damaged items, wrong items, return fraud ring, etc.

In step 505, return system 307 may transmit the determined risk level to the kiosk 301. The risk level is divided into high-risk, low-risk, or medium-risk and may be accompanied by a rejection reason.

In step 506, kiosk 301 may receive the risk level sent in step 505 and, in step 508, may determine whether the received risk level is medium. If the received risk level is medium, kiosk 301, in step 509, may display a request for additional information on display 402 and capture the requested additional information. If the received risk level is not medium, kiosk 301, in step 513, may display a return result on display 402.

In step 509, kiosk 301 may capture additional information. For example, kiosk 301 may request additional information to a customer by presenting the request on display 402 and capture the requested additional information using imaging device 401 or display 402. The additional information may be, but not limited to, an image of return item, a picture of the customer, or additional proof related to the return.

In step 510, kiosk 301 may transmit the captured additional information to return system 307 via network 302. When the kiosk 301 transmits the captured additional information, return system 307, in step 511, may receive the additional information and validate the additional information. For example, return system 307 may look up a received image of return item in a database storing images of stocked items to validate the additional information.

In step 512, return system 307 may transmit a validation result to kiosk 301 via network 302. For example, return system 307 may assign an indicator to a validation result when additional information sent in 510 is validated.

In step 513, kiosk 301 may display a return result on display 402. For example, kiosk 301 may display a reject decision with a reject reason on display 402 and perform no further executions when the received risk level is high or medium without an assigned indicator in validation result. Exemplary reject decisions displayed on display 402 are "Your return is rejected because risk level is high," and "You are not allowed to use kiosk for auto return and your account is blocked. Please call customer service to unblock it." In another example, kiosk 301 may display an accepted notification and next step instructions on display 402 when the received risk is low or medium with an assigned indicator in validation result.

In step 514, kiosk 301 may accept the return item when the received risk is low or medium with an assigned indicator in validation result. For example, kiosk 301 may accept a return item by ejecting a container 403A for a customer to store the return item. By way of further example, a customer may store a return item in an ejected container 403A and return the container 403A to kiosk 301 via receptacle 404.

Figure 6:
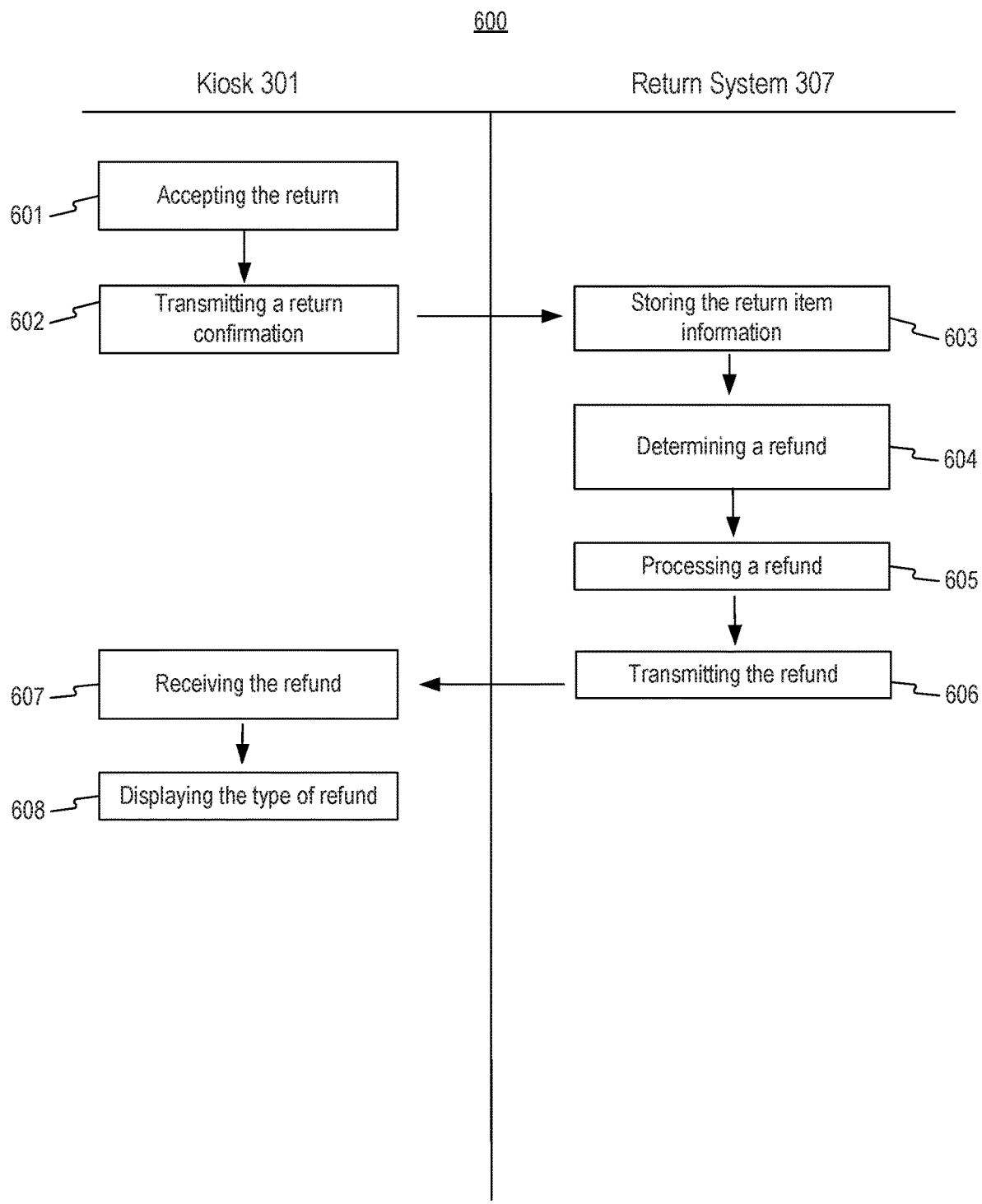
FIG. 6 is an exemplary flow chart of process for processing a refund for an accepted return item using an automated kiosk in real time, consistent with the disclosed embodiments.

FIG. 6 is an exemplary flow chart of process 600 for processing a refund for an accepted return item using an automated kiosk 301 in real time. While FIG. 6 is described with respect to a kiosk 301 and return system 307, one of ordinary skill in the art will recognize that other configurations are possible.

In step 601, kiosk 301 may accept a return when it receives a container 403A storing a return item via receptacle 404 as described above with respect to step 514 in FIG. 5. For example, kiosk 301 may accept a return item by ejecting a container 403A for a customer to store the return item. By way of further example, a customer may store a return item in an ejected container 403A and return the container 403A to kiosk 301 via receptacle 404.

In step 602, kiosk 301 may transmit a return confirmation to return system 307 via network 302. The return confirmation may include return item information representing the return item, a risk level associated with the return item, and an identifier associated with the container storing the return item.

In step 603, return system 307 may receive the return confirmation sent in step 602 and store the received return confirmation. Return system 307 may train the supervised machine learning model (described above with respect to step 503 in FIG. 5) using the stored return confirmation.

In step 604, return system 307 may determine a refund based on the received risk level associated with a return item and a return amount associated with return item information. For example, return system 307 may assign an instant refund for a low risk & low amount return item, a fast refund, needing an item verification, for a low risk & high amount return item, and a postponed refund for a medium risk return item. The high & low amount is determined by comparing the return amount against a predefined amount and the postponed refund may require an item verification or card information verification.

In step 605, return system 307 may process the determined refund from step 604. The process may require storing related information about a return amount, an order amount, or pending amount. For example, return system 307 may process an instant refund by issuing a refund amount to a bank account associated with a return customer.

In step 606, return system 307 may transmit the determined refund from step 604 to the kiosk 301 via network 302. The refund may include an instant refund (for a low risk & low amount return item), a fast refund (for a low risk & high amount return item), and a postponed refund (for a medium risk return item).

In step 607, kiosk 301 may receive the refund sent in step 606 and display the received refund in step 608. For example, kiosk 301 may display, on display 402, "Your return is successful and your refund is processed," for an instant refund, "Your return is successful and your refund is in process until the item is verified," for a fast refund, and "Your return is accepted and refund is postponed until the item is verified," and "Your return is accepted and refund is postponed until card information is verified," for a postponed refund.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An automated kiosk for collecting return items based on a real time risk decision, comprising:
   one or more memory devices storing instructions;
   a display screen configured to present a return result based on a received risk level; and
   one or more processors configured to execute the instructions to perform operations in real-time, the operations comprising:
      capturing, using an imaging device, return item information comprising at least one of: an order ID, an item ID, a product barcode, a pre-generated QR code, or a pre-generated return ID;
      transmitting, the return item information and a request for return risk level relating to the return information to a server operable to execute a machine learning model trained on historical information to predict a risk score, wherein the server is configured to:
         prepare the return risk level using a supervised machine learning model trained on historical information including at least one of a return history, a return amount, a list of returned products, or a return time; and
         prepare the return risk level in response to the request by:
            predicting a risk score of the return request based on the captured return item information by deploying the machine learning model;
            determining a risk level based on the predicted risk score; and
            transmitting the determined risk level to the kiosk;
      receiving the transmitted risk level from the server; and
      accepting a return item associated with the return item information based on the received risk level.

2. The automated kiosk of claim 1, further comprising one or more containers, each container associated with an identifier associated with a status of empty or occupied, a receptacle, and further wherein the processor is configured to execute the instructions to perform operations comprising ejecting, via the receptacle, one of the containers associated with an empty status to store the return item when the risk level is low or medium.

3. The automated kiosk of claim 2, further comprising:
   transmitting, to a server, a return confirmation, wherein the server is configured to process a refund by:
      storing the return item information;
      determining a refund based on the determined risk level and a return amount;
      processing a refund based on the determined refund;
      transmitting the determined refund to the kiosk;
   receiving the determined refund from the server; and
   displaying the received refund on a display screen.

4. The automated kiosk of claim 3, wherein the refund is instant when the risk level is low and the return amount is lower than a predefined amount.

5. The automated kiosk of claim 3, wherein the refund is fast when the risk level is low and the return amount is higher than a predefined amount.

6. The automated kiosk of claim 3, wherein the refund is postponed when the risk level is medium.

7. A method for collecting return items using an automated kiosk based on a real time risk decision, comprising:
   capturing, using an imaging device, return item information comprising at least one of: an order ID, an item ID, a product barcode, a pre-generated QR code, or a pre-generated return ID;
   transmitting, the return item information and a request for return risk level relating to the return information to a server operable to execute a machine learning model trained on historical information to predict a risk score, wherein the server is configured to:
      prepare the return risk level using a supervised machine learning model trained on historical information including at least one of a return history, a return amount, a list of returned products, or a return time; and
      prepare the return risk level in response to the request by:
         predicting a risk score of the return request based on the captured return item information by deploying the machine learning model;
         determining a risk level based on the predicted risk score; and
         transmitting the determined risk level to the kiosk;
   receiving the transmitted risk level from the server;
   accepting a return item associated with the return information based on the received risk level; and
   presenting a return result on a display screen based on the received risk level.

8. The method of claim 7, further comprising ejecting, via a receptacle, a container associated with an empty status for a user to store the return item when the risk level is low or medium, each container associated with an identifier associated with a status of empty or occupied.

9. The method claim 8, further comprising:
   transmitting, to a server, a return confirmation, wherein the server is configured to process a refund by:
      storing the return item information;
      determining a refund based on the determined risk level and a return amount;
      processing a refund based on the determined refund;
      transmitting the determined refund to the kiosk;
   receiving the determined refund from the server; and
   displaying the received refund on a display screen.

10. The method of claim 9, wherein the refund is instant when the risk level is low and the return amount is lower than a predefined amount.

11. The method of claim 9, wherein the refund is fast when the risk level is low and the return amount is higher than a predefined amount.

12. The method of claim 9, wherein the refund is postponed when the risk level is medium.

\* \* \* \* \*

UNITED STATES PATENT AND TRADEMARK OFFICE
CERTIFICATE OF CORRECTION

PATENT NO. : 11,120,498 B2  
APPLICATION NO. : 16/845239  
DATED : September 14, 2021  
INVENTOR(S) : Yonghui Chen et al.

Page 1 of 1

It is certified that error appears in the above-identified patent and that said Letters Patent is hereby corrected as shown below:

In the Claims

Claim 9, Column 22, Line 52, "The method claim 8," should read --The method of claim 8,--.

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*